(12) United States Patent
Piaskowski et al.

(10) Patent No.: US 9,380,663 B2
(45) Date of Patent: Jun. 28, 2016

(54) LED LAMP, AND METHOD OF DRIVING AT LEAST ONE LED STRING THEREOF

(71) Applicant: BRAMAL LED INC., Côteau-du-Lac (CA)

(72) Inventors: Andrew Dionizy Piaskowski, Saint-Colomban (CA); Mathieu Ludovic Malboeuf Joset, Côteau-du-Lac (CA); Dorian Braun, Pointe-Claire (CA)

(73) Assignee: BRAMAL LED INC., Côteau-du-Lac (CA)

( * ) Notice: Subject to any disclaimer, the term of this patent is extended or adjusted under 35 U.S.C. 154(b) by 0 days.

(21) Appl. No.: 14/760,915

(22) PCT Filed: Jan. 21, 2014

(86) PCT No.: PCT/CA2014/050042
§ 371 (c)(1),
(2) Date: Jul. 14, 2015

(87) PCT Pub. No.: WO2014/113886
PCT Pub. Date: Jul. 31, 2014

(65) Prior Publication Data
US 2015/0366012 A1 Dec. 17, 2015

Related U.S. Application Data

(60) Provisional application No. 61/755,128, filed on Jan. 22, 2013.

(51) Int. Cl.
H05B 37/02 (2006.01)
H05B 33/08 (2006.01)
F21K 99/00 (2016.01)

(52) U.S. Cl.
CPC .............. *H05B 33/0815* (2013.01); *F21K 9/17* (2013.01); *H05B 33/0845* (2013.01); *H05B 33/0851* (2013.01); *Y02B 20/386* (2013.01)

(58) Field of Classification Search
CPC ........... H05B 33/0815; H05B 33/0827; H05B 33/0887
USPC .................................................. 315/291, 297
See application file for complete search history.

(56) References Cited

U.S. PATENT DOCUMENTS 7,067,992 B2 6/2006 Leong et al.
8,210,716 B2 7/2012 Lerman et al.
(Continued)

FOREIGN PATENT DOCUMENTS

WO 2012068687 A1 5/2012

*Primary Examiner* — Don Le
(74) *Attorney, Agent, or Firm* — Norton Rose Fulbright Canada LLP

(57) ABSTRACT

The Light Emitting Diode (LED) lamp is adapted for mounting in a fluorescent tube mount having a selectively activatable magnetic ballast powering two pairs of sockets with AC power upon activation. The LED lamp has a body having connectors at both opposite ends adapted to the corresponding pair of sockets, at least one LED string extending along at least a portion of the body, a driver inside the body connecting the connectors to the LED string, the driver including a transistor, an inductor, and a rectifier in a switch mode converter configuration, for converting the AC power of the sockets into a DC power of a voltage adapted to power the LED string; and a pulse mode controller for controlling the transistor in an intermittent manner upon activation of the multiple fluorescent tube mount, until conduction across the at least one LED string is achieved.

10 Claims, 7 Drawing Sheets

(56) References Cited

U.S. PATENT DOCUMENTS

| | | |
|---|---|---|
| 2007/0228999 A1 | 10/2007 | Kit |
| 2010/0110682 A1 * | 5/2010 | Jung .................. H05B 33/0869 362/249.02 |
| 2010/0283409 A1 * | 11/2010 | Yinn .................. H05B 33/0827 315/297 |
| 2010/0289428 A1 | 11/2010 | Frazier et al. |
| 2011/0057572 A1 | 3/2011 | Kit et al. |
| 2012/0153865 A1 | 6/2012 | Rolfes et al. |
| 2013/0293133 A1 * | 11/2013 | Min .................... H05B 33/0884 315/210 |
| 2014/0125253 A1 * | 5/2014 | Chen ...................... H05B 37/02 315/307 |
| 2014/0265935 A1 * | 9/2014 | Sadwick ............ H05B 33/0848 315/307 |
| 2014/0300274 A1 * | 10/2014 | Acatrinei ........... H05B 33/0815 315/85 |

* cited by examiner

LED LAMP, AND METHOD OF DRIVING AT LEAST ONE LED STRING THEREOF

FIELD

The improvements generally relate to the field of Light Emitting Diodes (LED) lamp systems, but more particularly to providing a LED lamp which can replace a fluorescent tube in a conventional fluorescent tube mount having a dual magnetic ballast.

BACKGROUND

Fluorescent tube lamps are gas-discharge lamps. When a discharge occurs between electrodes of a fluorescent tube due to a voltage exceeding a certain threshold, a short is created from one electrode to the other and current rapidly rises. If the current is not controlled, the fluorescent tube can break.

Henceforth, fluorescent tube mounts are provided with a ballast which has the function of providing a satisfactory form of electric power to correctly drive the fluorescent tubes therein. Two of the most common forms of ballasts are magnetic ballasts and electronic ballasts. Magnetic ballasts were used for many decades. The most common forms of magnetic ballast are the lead-lag circuit and the series sequence circuit which can be used to simultaneously drive two fluorescent tubes held in corresponding sockets of a multiple fluorescent tube mount. The lead-lag circuit allows to offset the intermittent activation of the fluorescent tubes (each running at ~50-60 Hz) by 180° in a manner to give the eye a lighting at ~100-120 Hz and thus reduce the potentially stroboscopic effect.

In recent years electronic ballasts have tended to replace magnetic ballasts. Electronic ballast build up a high amount of voltage typically faster than magnetic ballasts (typically in less than 1 ms) and can thus lead to more instantaneous illumination. Moreover, independent electronic ballasts are typically provided for corresponding fluorescent tubes. Notwithstanding the above, dual magnetic ballasts are still widely present, especially in older constructions.

In even more recent years, Light Emitting Diodes (LEDs) lamps have received an increasing amount of attention, especially given the fact that their lighting efficiency and power consumption are now considered to compete with fluorescent tube lighting. There is thus an increased motivation for providing a LED lamp product which could simply replace a fluorescent tube on existing ballasts.

Although such LED lamp products have been provided which were satisfactory to a certain degree, there remained room for improvement. Particularly in addressing the issues specific to making the LED lamp adaptable to dual magnetic ballasts.

SUMMARY

Simply using a driver which drives a LED string with a typical switch mode converter led to unbalanced operation in dual magnetic ballasts where the two most common situations were alternating, or significantly uneven lighting of the two LED lamps replacing the fluorescent tubes.

Dual magnetic ballasts typically heat the filament of the fluorescent tubes they were designed for progressively (most commonly in terms of milliseconds) while building up the threshold voltage required for satisfactory discharge. Discharge progressively begins to occur, and current thus begins to flow partially, as the voltage reaches the threshold voltage of the tube. Fluorescent tubes thus represent a particular form of electric load when integrated in the overall dual magnetic ballast and fluorescent tube circuit. It was found that this particularity was relevant to allowing a balanced mode of operation to be set up by the magnetic ballast with the fluorescent tubes.

It was found that a balanced mode of operation of a LED string could be achieved in dual magnetic ballasts by providing the LED string with a driver which allows the LED lamps to mimic (somewhat) the electric load behaviour of fluorescent tubes. More specifically, by intermittently activating the transistor of a typical switch mode converter, the activation voltage ramped up progressively and when the LED string threshold voltage was reached, both LED lamps were driven in a satisfactorily balanced manner.

In accordance with one aspect, there is provided a Light Emitting Diode (LED) lamp for mounting in a corresponding one of at least two pairs of sockets of a fluorescent tube mount, the fluorescent tube mount having a selectively activatable magnetic ballast powering two of the pairs of sockets with AC power upon activation, the LED lamp comprising: a body having connectors at both opposite ends adapted to the corresponding pair of sockets; at least one LED string extending along at least a portion of the body; and a driver inside the body connecting the connectors to the LED string, the driver being configured to provide a progressive voltage increase to the at least one LED string during a period of time following activation of the magnetic ballast.

In accordance with another aspect, there is provided a method of driving at least one LED string using a transistor, an inductor and a rectifier in a switch mode converter configuration; the method comprising: intermittently activating the transistor until detecting illumination of the LEDs of the at least one LED string.

In accordance with another aspect, there is provided a Light Emitting Diode (LED) lamp for mounting in a corresponding one of at least two pairs of sockets of a fluorescent tube mount, the fluorescent tube mount having a selectively activatable magnetic ballast powering two of the pairs of sockets with AC power in a lead-lag configuration upon activation, the LED lamp comprising: a body having connectors at both opposite ends adapted to the corresponding pair of sockets; at least one LED string extending along at least a portion of the body; a driver inside the body connecting the connectors to the LED string, the driver including: a transistor, an inductor, and a rectifier in a switch mode converter configuration, for converting the AC power of the sockets into a DC power of a voltage adapted to power the LED string; and a pulse mode controller for controlling the transistor in an intermittent manner upon activation of the multiple fluorescent tube mount, until conduction across the at least one LED string is achieved.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
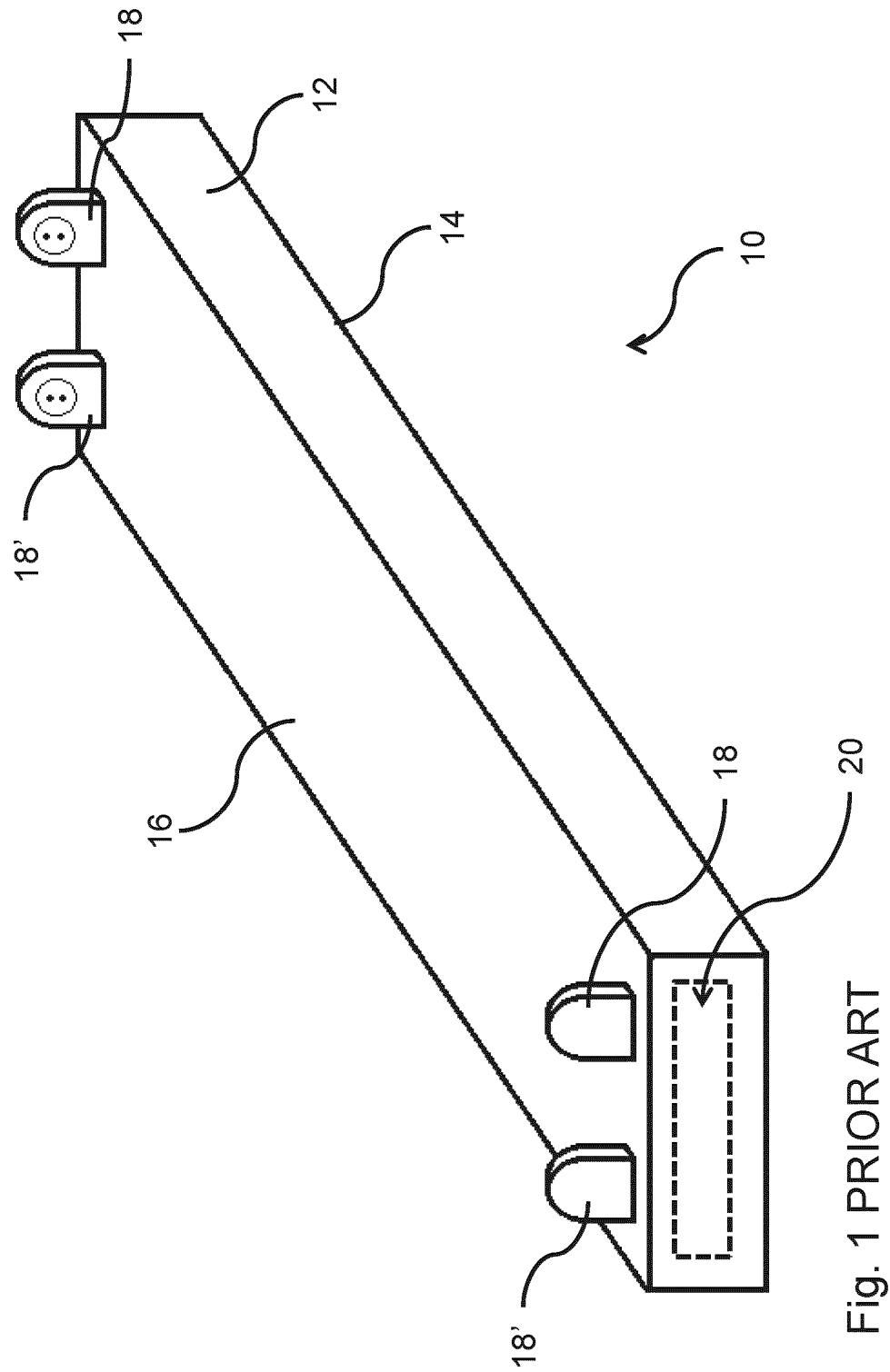
FIG. 1 is an oblique view of an example of a multiple fluorescent tube mount.

FIG. 1 shows an example of a dual fluorescent tube mount 10 as known in the art. The multiple fluorescent tube mount 10 generally has an elongated frame 12. In the illustrated embodiment, the elongated frame 12 has a backing 14 and a facing 16, and has two pairs of sockets 18, 18' disposed thereon. In this embodiment, the fluorescent tube mount has two pairs of sockets, though it will be understood that in alternate embodiments, fluorescent tube mounts can have more than two pairs of sockets and be adapted to receive more than two fluorescent tubes. When the backing 14 is mounted to a surface, the pairs of sockets 18, 18' are directed towards a room or other area to be lit. In this example, the multiple fluorescent tube mount 10 has a dual magnetic ballast 20 connected to the two pairs of sockets 18, 18'. An electricity mains can be provided to the magnetic ballast 20 using conventional electrical wiring for providing an AC current to the two pairs of sockets 18, 18' of the multiple fluorescent tube mount 10.

Figure 2:
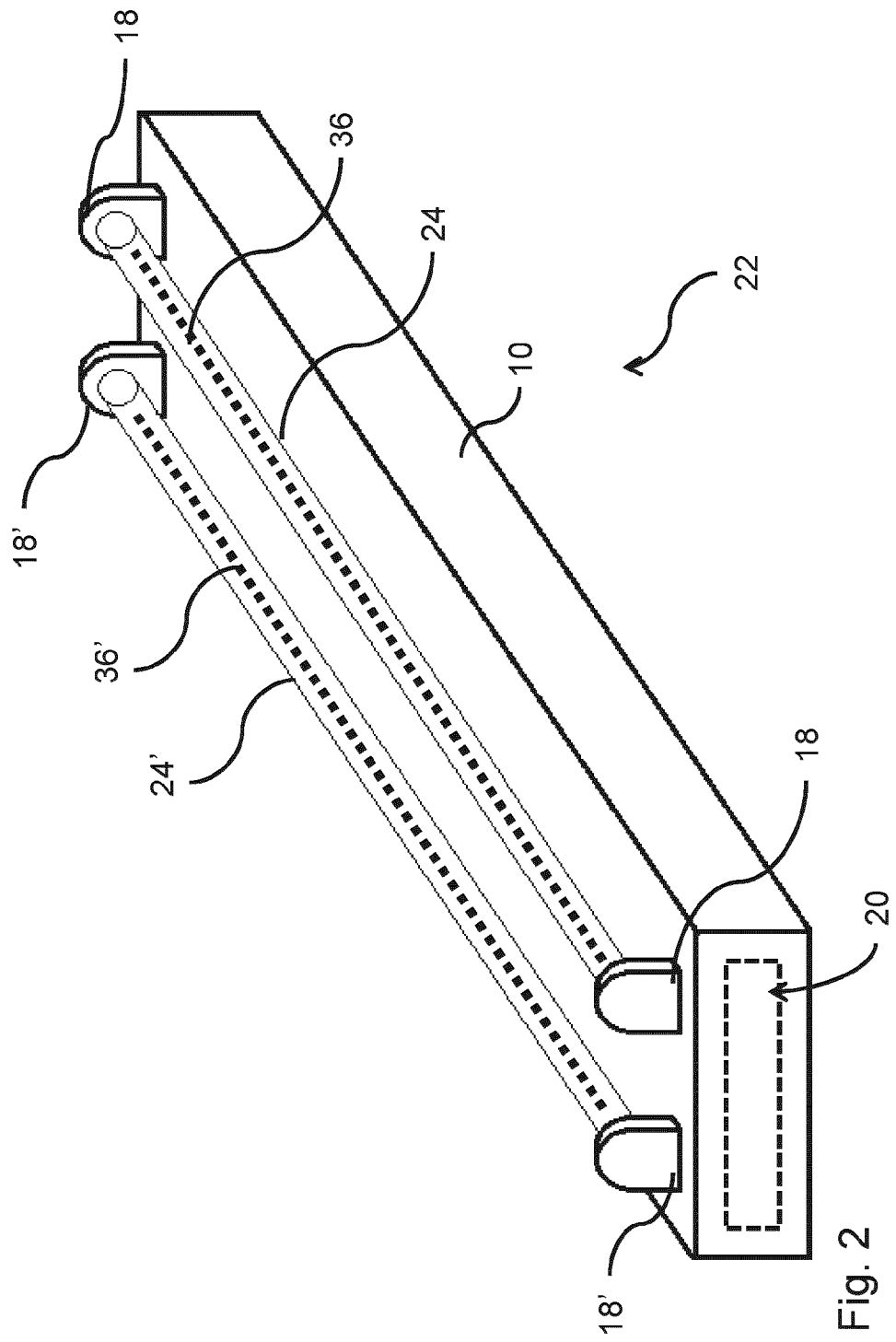
FIG. 2 is an oblique view showing an example of a LED lamp system formed with two LED lamps and the multiple fluorescent tube mount of FIG. 1.

FIG. 2 is an example of a LED lamp system 22 where LED lamps are used to replace the fluorescent tubes the multiple fluorescent tube mount 10 was designed for. More specifically, two LED lamps 24, 24' (only a first example of the LED lamps is shown) can be manually installed in corresponding pairs of sockets 18, 18' following removal of fluorescent tubes. Each of the LED lamps 24, 24' incorporates at least one LED string (multiple LEDs connected in series) driven by a driver (not shown in FIG. 2) having a switch mode converter and a pulse mode controller which will be detailed further below, and which, when combined with the dual magnetic ballast 20 of the multiple fluorescent tube mount 10, allows for a balanced mode of operation of the two LED lamps 24, 24'. In the balanced mode of operation, the two LED lamps 24, 24' are operated continuously by the magnetic ballast 20 at a satisfactorily similar intensity.

As referred to above, using LED strings driven by corresponding switch mode converters but without the pulse mode controller led to unsatisfactory, unbalanced operation of the two LED lamps, e.g. alternating flickering or uneven intensity of the two LED lamps. More specifically, it appears that when using such LED lamps, the controller of the switch mode converter attempts to immediately power the LED upon activation, which allows current to flow across the controller, which could entrain voltage drop and its deactivation. This was repeated a given number of times until, for instance, one of the LED lamps was lit, which drained the power from the magnetic ballast preventing correct activation of the other one of the LED lamps.

Figure 3:
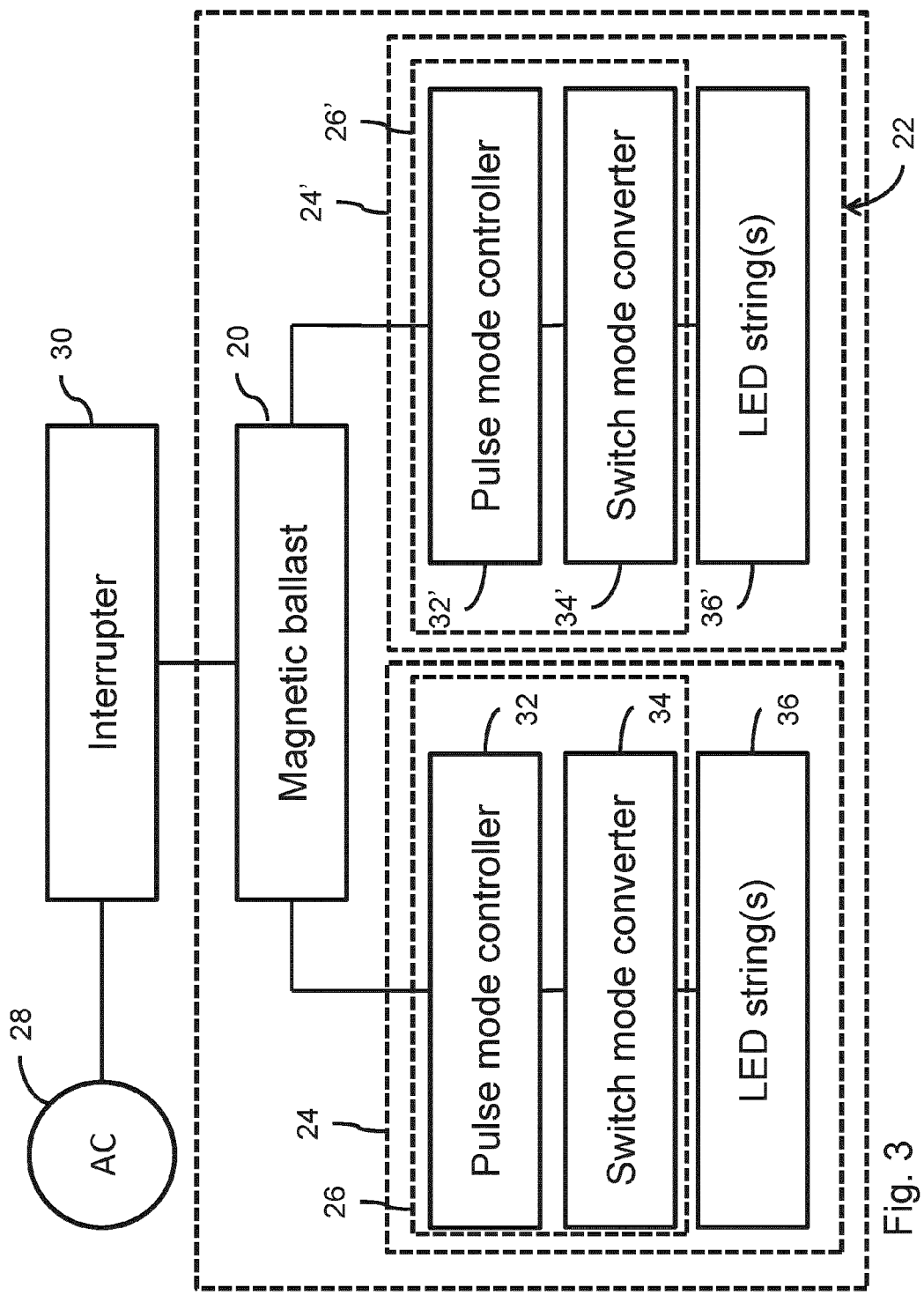
FIG. 3 is a block diagram of the LED lamp system of FIG. 2.

FIG. 3 shows a block diagram illustrating the LED lamp system 22 which shows the drivers 26, 26' of the LED Lamps 24, 24' which incorporate the pulse mode controllers 32, 32'. More specifically, the mains 28 which supplies an AC power to a magnetic ballast 20 of the multiple fluorescent tube mount 10. The AC power can be selectively activatable with an interrupter 30 to be actuated by a user, for instance. When the interrupter 30 is actuated, the AC power is provided, in a parallel fashion, to a first pulse mode controllers 32, and to a second pulse mode controller 32' via the dual magnetic ballast 20, which act on corresponding first and second switch mode converters 34, 34' to ultimately power corresponding first and second LED lamps 36, 36'.

Figure 4:
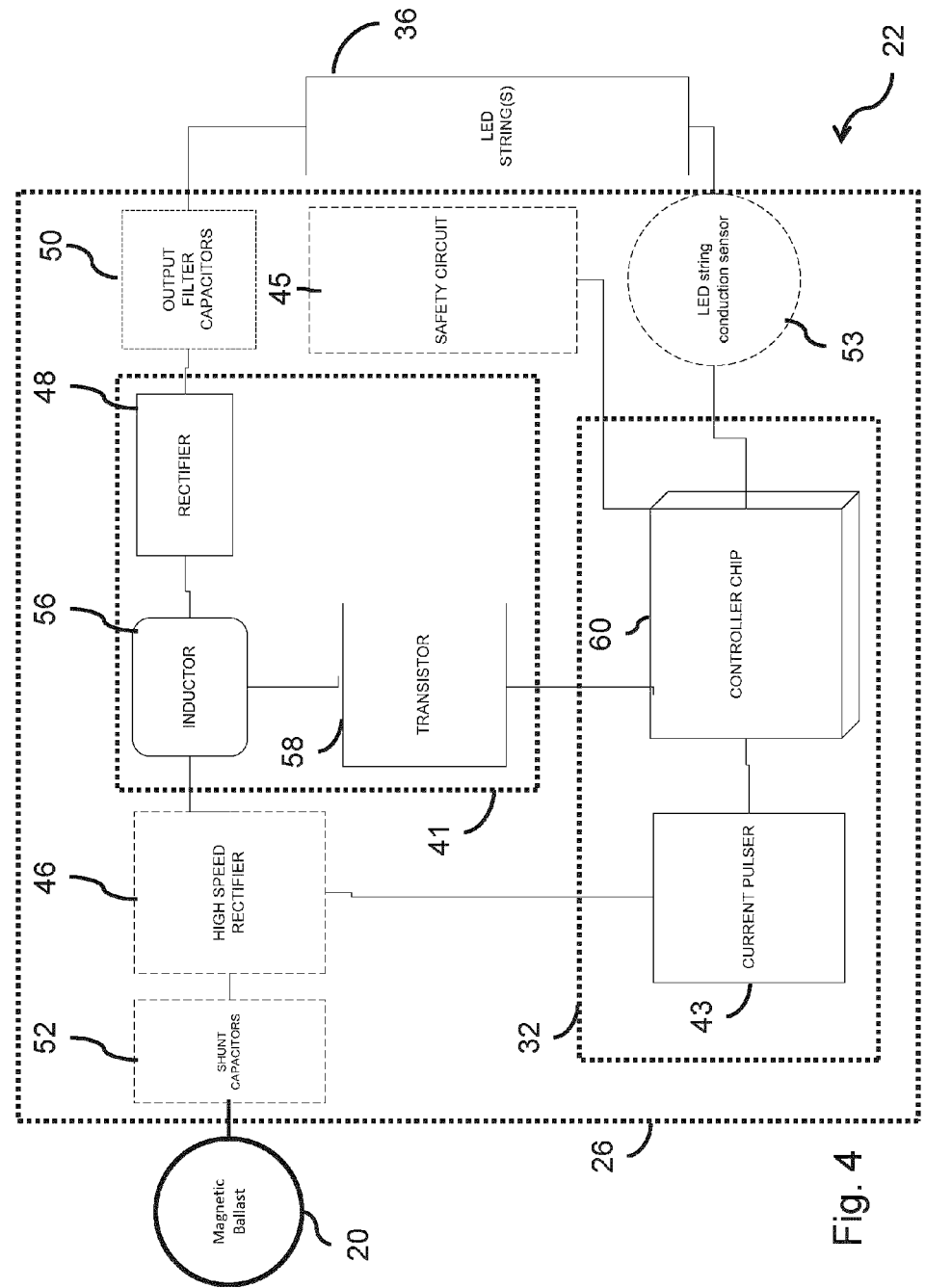
FIG. 4 is a block diagram of a first example of a LED lamp driver.

FIG. 4 provides a more detailed illustration of an embodiment of a LED lamp driver 26. In this embodiment, a transistor 58, an inductor 56 and a rectifier 48 are arranged in a switch mode converter arrangement 41. A typical switch mode converter also includes a controller chip 60 which is used to drive the transistor in a continuous manner. In this embodiment, the pulse mode controller has a current pulser 43 (which can, in this embodiment, also be referred to as a current pulser and limiter since it also limits/conditions the intensity of the electricity reaching the controller chip). The current pulser 43 provides intermittent power to the controller chip 60 entraining continuous driving of the transistor 58 during a starting period following activation of the magnetic ballast 20.

In this embodiment, the magnetic ballast 20 provides AC power to the LED string(s) 36 via the switch mode converter arrangement 41. The current pulser 43 can provide a pulsed and limited current to the controller chip 60. Then, the controller chip can go on and off (on-state, off-state) repeatedly in accordance with the pulses of the pulsed current. At each on-state of the controller chip 60, the latter has enough energy to reach a threshold of the transistor 58, which can provide a increment of voltage to the LED string(s) 36, progressively building voltage. Once sufficient increments of voltage have been provided to the LED string(s), it can start to conduct electricity, and emit light in a continuous fashion, at which point it also conducts electricity. When the LED string(s) 36 conduct, power is fed back to the controller chip 60 by a feedback loop which overrides the intermittent pulses of the current pulser and allows the controller chip to continuously drive the transistor. In this sense, the feedback loop can be considered to also provide the function of a LED string conduction sensor 53 in this embodiment. At this point, both LED lamps can operate in a balanced manner, since the incremental increase of voltage occurs in both LED lamps connected to the dual magnetic ballast. When such a progressive rise of current is achieved (incremental increase), the LED lamp somewhat mimics a conventional fluorescent tube. Consequently, LED lamps can be installed in conventional multiple fluorescent tube mounts having dual magnetic ballasts.

In this specific embodiment, the controller chip 60 can provide a satisfactory voltage buildup by pulsing on and off between 2 and 100 times within a period of 100 ms following activation of the dual magnetic ballast.

More generally, the driver 26 can force the magnetic ballast 20 to provide a progressive increase of voltage to each of the two LED string(s) 36, 36', which allows balancing the buildup voltage and subsequent illumination of the first and second LED lamps 36, 36'.

Figure 7:
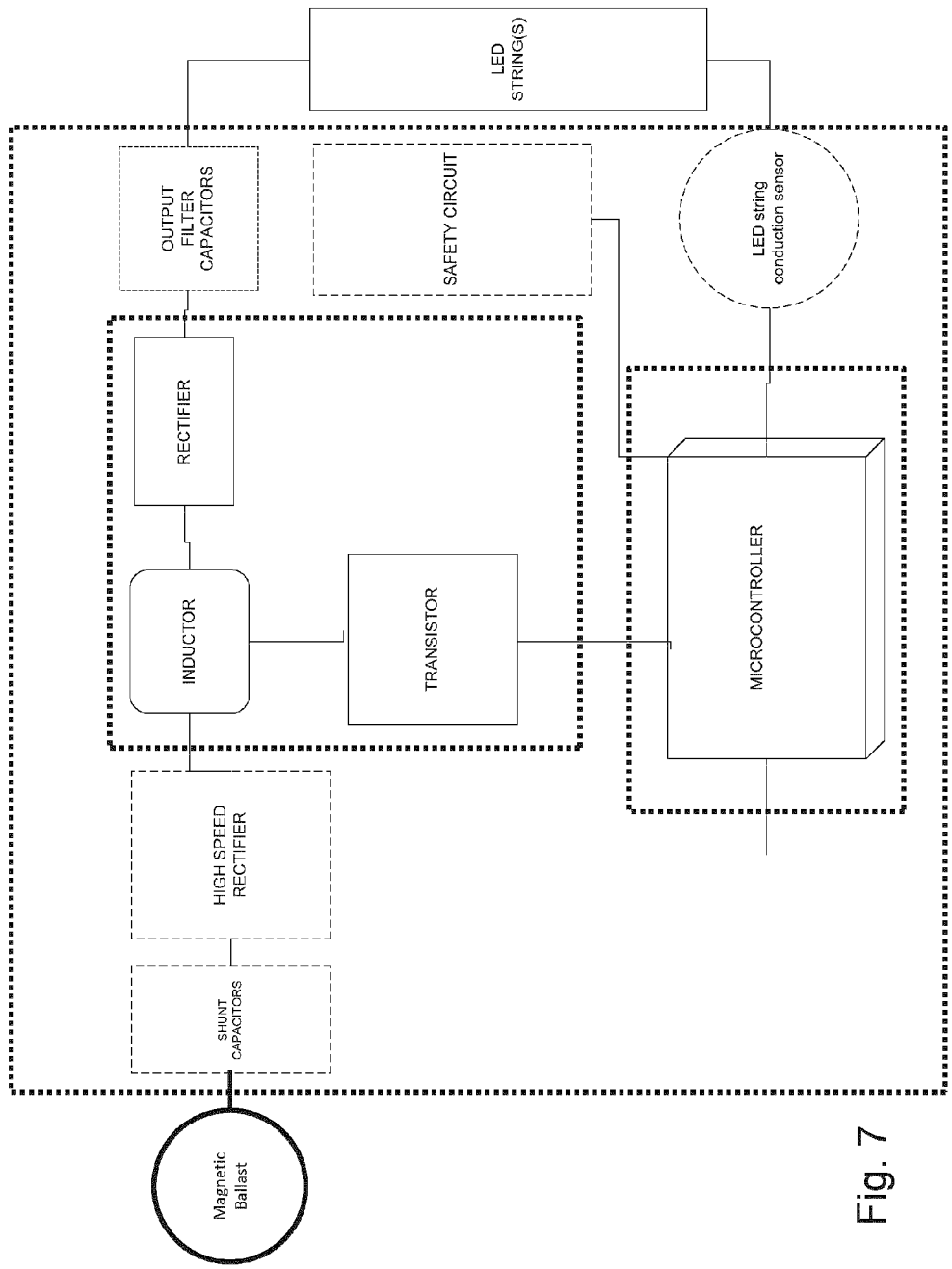
FIG. 7 is a block diagram of a second example of a LED lamp driver.

As illustrated in FIG. 7, in another embodiment, the pulse mode controller 32 can be provided in the form of a microcontroller programmed to provide intermittent activation of the transistor 58 until LED string conduction is determined (e.g. via a sensor).

In still another example alternate embodiment, a progressively increasing current slope can otherwise be provided to the LED string 36 (e.g. without the use of a pulse mode converter arrangement altogether, and/or via a computer or device having satisfactory capabilities). It will be understood that in a preferred mode, each LED lamp has one or more LED strings having an voltage illumination threshold of over 500V and in other words, this voltage is built progressively to reach the illumination threshold. The duration of the building of the illumination voltage can vary depending on a plurality of factors, including the available power source (mains). However, it can be considered safe to assume that it will always more progressive than electronic ballasts, which can build up the voltage in less than one millisecond. The voltage buildup can thus be driven to take more than 1 ms, and more likely tens of ms, following activation.

Referring back to FIG. 4, a possible embodiment can be seen to further incorporate optional shunt capacitors 52 and high speed rectifier 46 (which can contribute to making the driver readily adapted to electronic ballast compatibility), output filter capacitors 50, and safety circuit 45.

Figure 5:
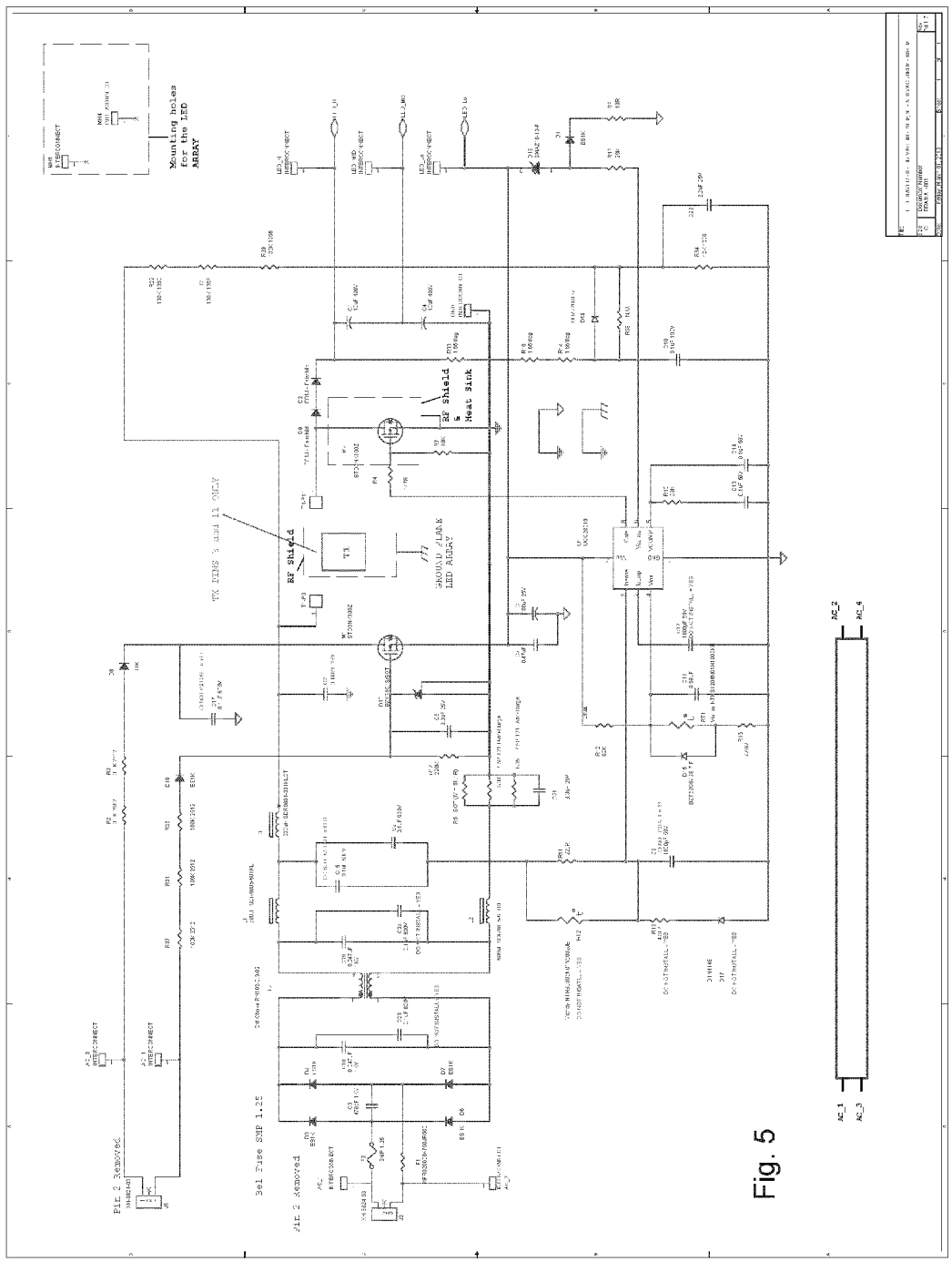
FIG. 5 is a schematic of an example electrical circuit of a LED lamp driver.

FIG. 5 is an example electrical circuit in accordance with the LED lamp system which incorporates the pulse mode controller, and other optional electrical components. In this example circuit, the current pulser has a RC circuit generating the pulsed activation of the controller chip. In this specific example, the capacitance has 10 mF and the resistance has 6-7 kOhms. In alternate embodiments using a similar current pulser, the capacitance can range between 1 mF and 470 mF and the resistance can range between 1 kOhms and 3 kOhms, for instance.

Figure 6:
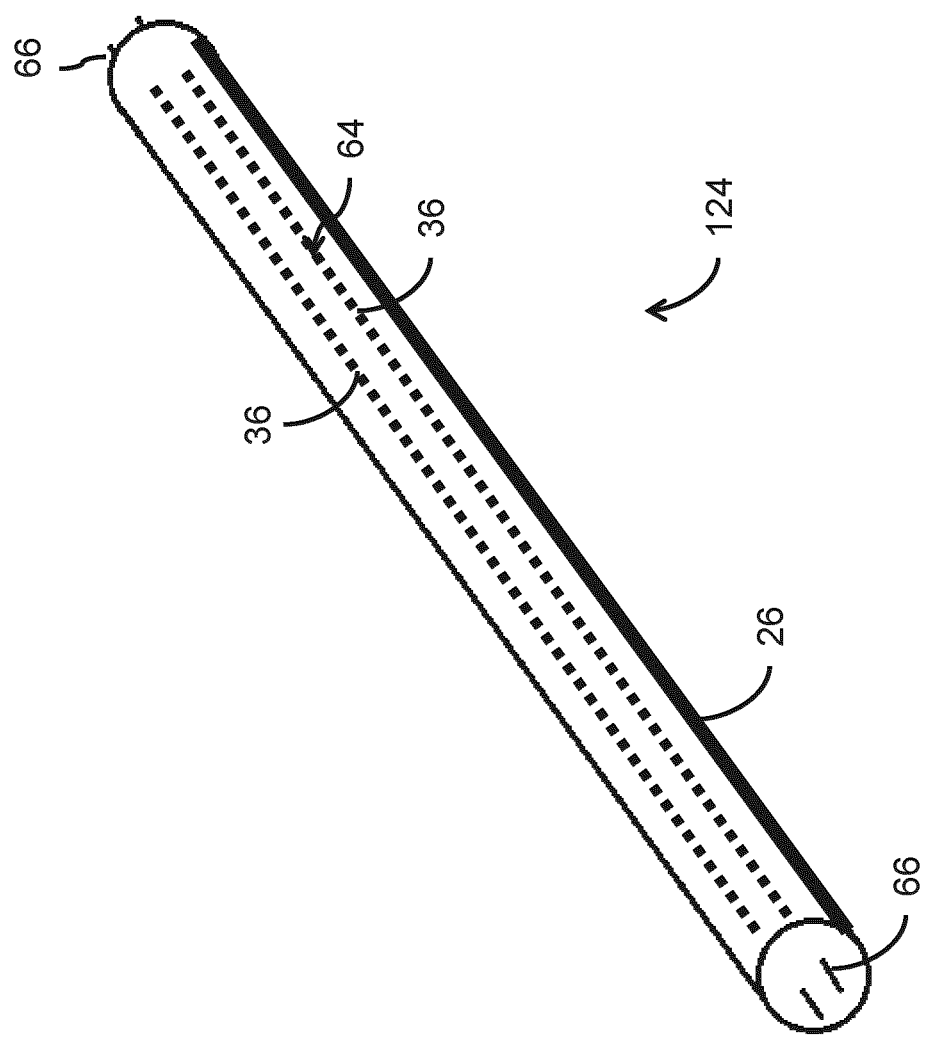
FIG. 6 is an oblique view of an example of a LED lamp.

FIG. 6 is a second example of a LED lamp 124. In contrast with the first example of LED lamps 24, 24' of FIG. 2, which each incorporates one LED string 36, the LED lamp 124 of FIG. 6 has a LED array 64 having two LED strings 36 adjacent one to the other. Of course, the LED lamp 124 is not limited to a rectilinear shape, and its LED array 64 is not limited only to two LED strings 36. Moreover, the LED lamp 124 has a bi-pin connector 66 for mating with a pair of sockets of the multiple fluorescent tube mount. The driver 26 can be hidden in the LED lamp, under the LED array 64, for instance.

As can be seen therefore, the examples described above and illustrated are intended to be exemplary only. The scope is indicated by the appended claims.

What is claimed is:

1. A Light Emitting Diode (LED) lamp for mounting in a corresponding one of at least two pairs of sockets of a fluorescent tube mount, the fluorescent tube mount having a selectively activatable magnetic ballast powering two of the pairs of sockets with AC power upon activation, the LED lamp comprising:
    a body having connectors at both opposite ends adapted to the corresponding pair of sockets;
    at least one LED string extending along at least a portion of the body; and
    a driver inside the body connecting the connectors to the LED string, the driver being configured to provide a progressive voltage increase to the at least one LED string during a period of time following activation of the magnetic ballast.

2. The LED lamp of claim 1 wherein the at least one LED string allows conduction at a voltage above 500V, and the period of time is of at least 1 ms.

3. The LED lamp of claim 1 wherein the driver includes:
    a transistor, an inductor, and a rectifier in a switch mode converter configuration, for converting the AC power of the sockets into a DC power of a voltage adapted to power the LED string; and
    a pulse mode controller for controlling the transistor in an intermittent manner upon activation of the magnetic ballast, until conduction across the at least one LED string is achieved.

4. The LED lamp of claim 3 wherein the transistor is pulsed between 2 and 100 times within 100 ms following activation of the magnetic ballast.

5. The LED lamp of claim 3 wherein the driver further includes a controller chip connected to the transistor; further comprising a current pulser for providing a pulsed power to drive the controller chip intermittently, and a voltage feedback loop from the LED string to the controller chip to continuously drive the controller chip upon conduction across the at least one LED string.

6. The LED lamp of claim 5 wherein the current pulser includes a RC circuit having a capacitance between 1 mF and 470 mF and a series resistance between 1 kOhms and 10 kOhms.

7. The LED lamp of claim 3 wherein the pulse mode controller includes a microcontroller and a LED string conduction sensor, the microcontroller being programmed to intermittently drive the transistor until determining LED string conduction based on LED string conduction sensor input.

8. The LED lamp of claim 1 wherein the progressive voltage increase is done during at least 10 ms following activation of the magnetic ballast.

9. The LED lamp of claim 1, wherein the driver and the at least one LED string mimic the electrical load of a conventional fluorescent tube.

10. A method of driving at least one LED string, the method comprising providing a progressive voltage increase to the at least one LED string during a period of time of at least 1 ms following activation of the magnetic ballast, further comprising driving the LED string using a transistor, an inductor, and a rectifier in a switch mode converter configuration, including pulsing the transistor between 2 and 100 times within a period of time of 100 ms following activation of the magnetic ballast.

* * * * *